Dec. 13, 1955    P. C. ACKERMAN    2,726,557
THERMOSTATICALLY CONTROLLED TRANSMISSION SYSTEM
Filed July 12, 1951    4 Sheets-Sheet 1
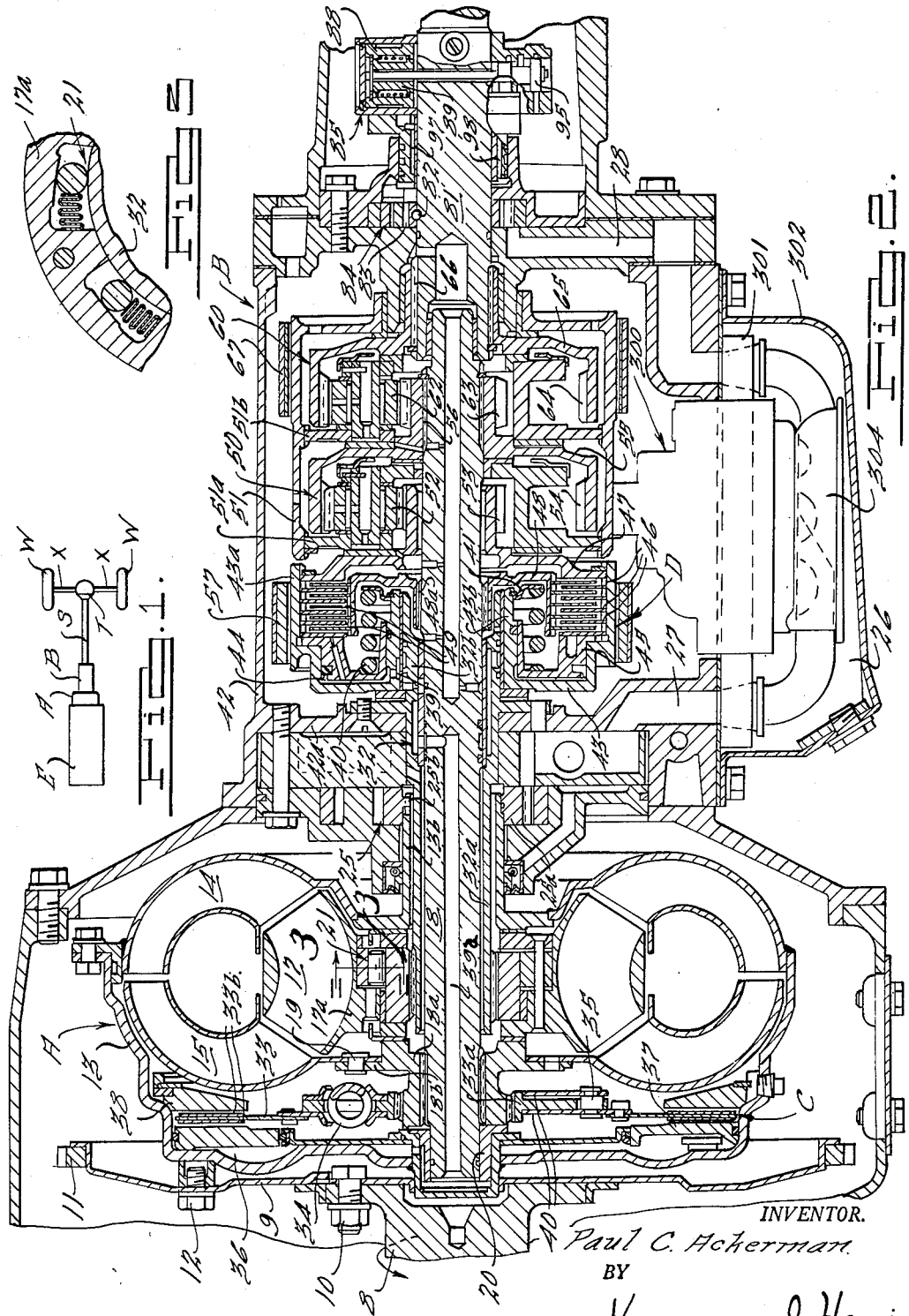
INVENTOR.
Paul C. Ackerman
BY
Harness and Harris
ATTORNEYS.

Dec. 13, 1955   P. C. ACKERMAN   2,726,557
THERMOSTATICALLY CONTROLLED TRANSMISSION SYSTEM
Filed July 12, 1951   4 Sheets-Sheet 2
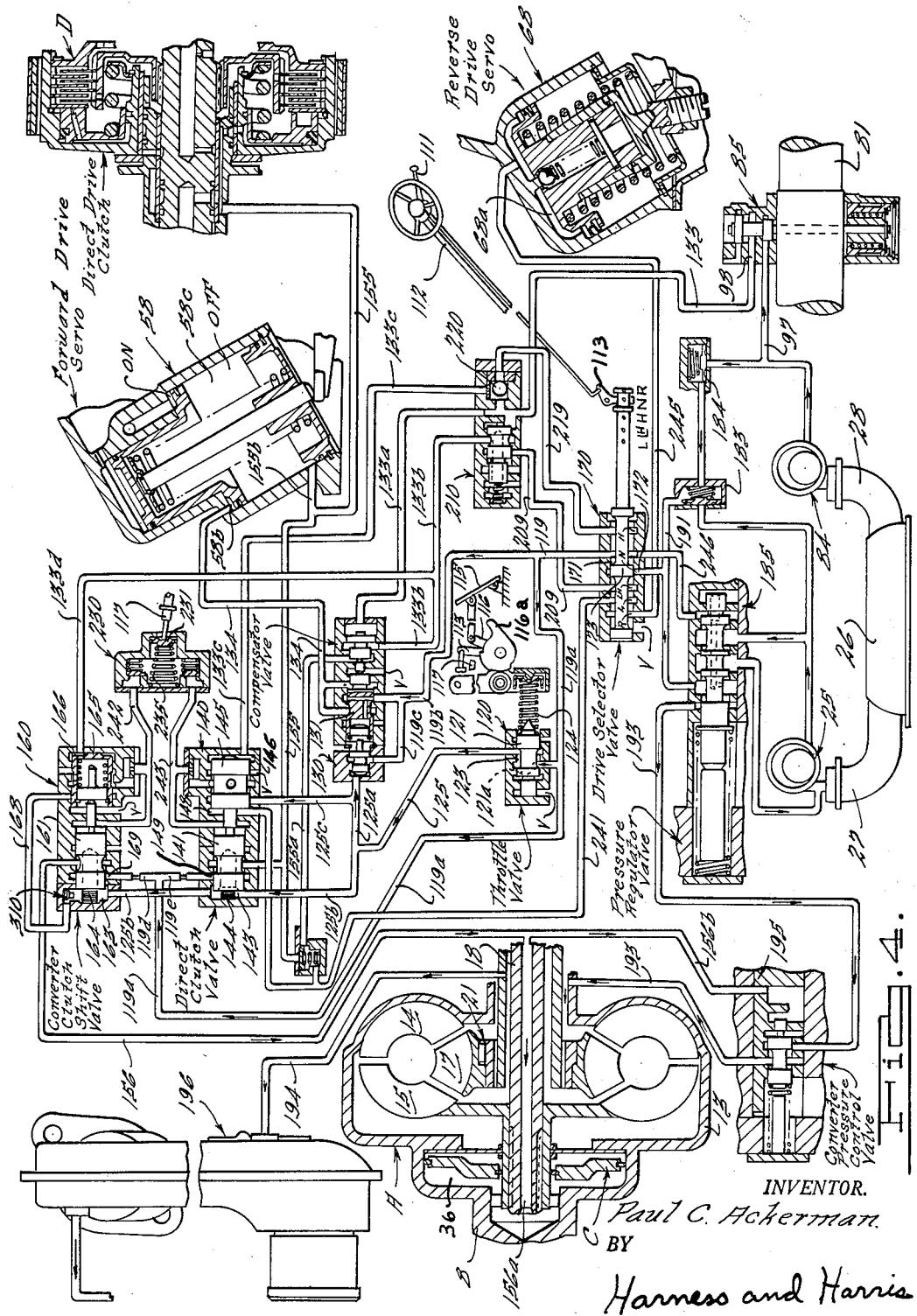
INVENTOR.
Paul C. Ackerman
BY
Harness and Harris
ATTORNEYS.

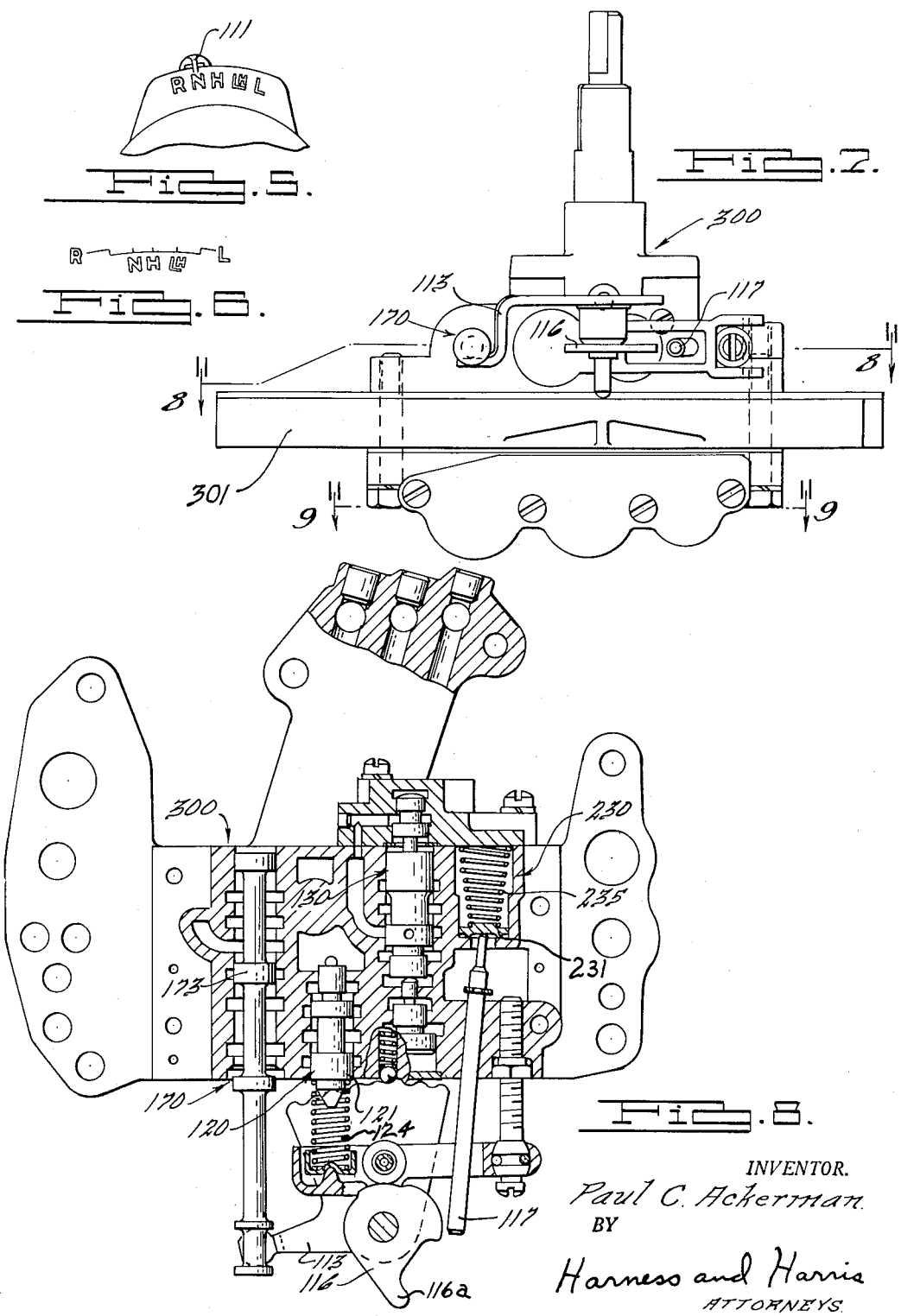

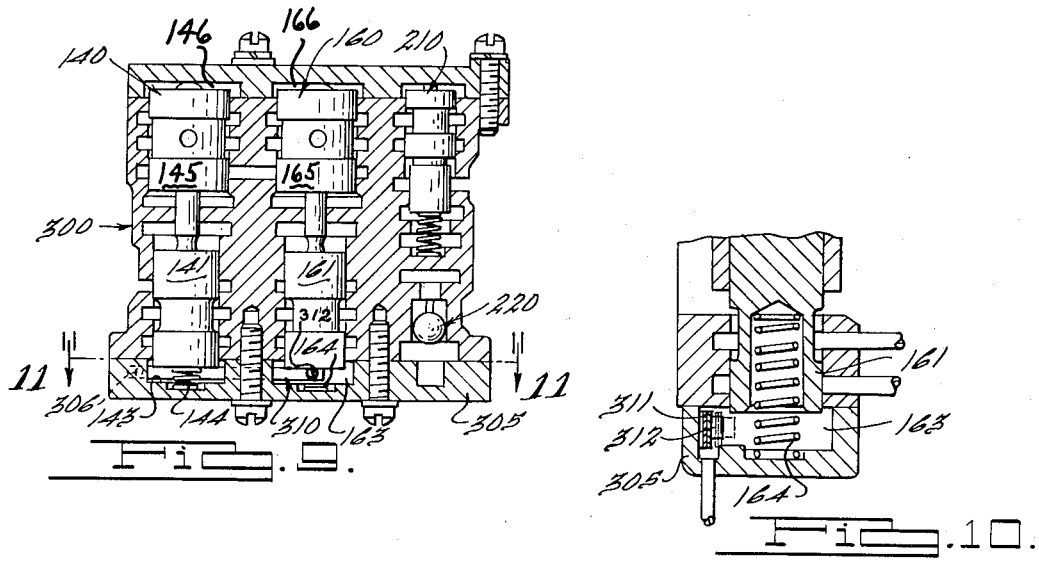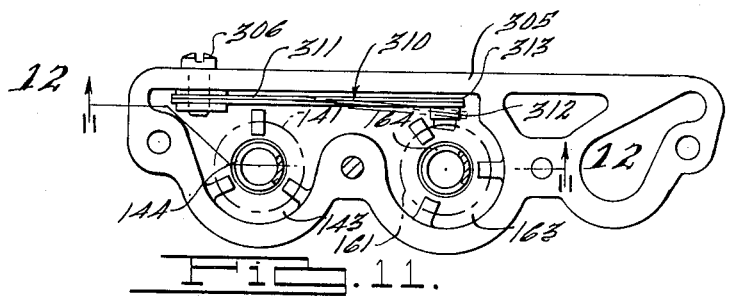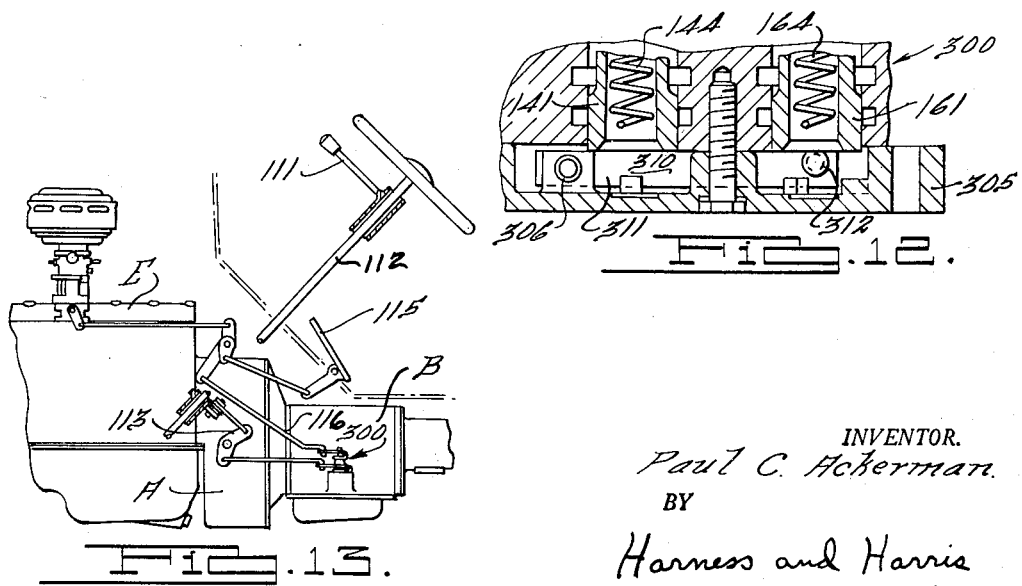

United States Patent Office 2,726,557
Patented Dec. 13, 1955

2,726,557

THERMOSTATICALLY CONTROLLED TRANSMISSION SYSTEM

Paul C. Ackerman, Detroit, Mich., assignor to Chrysler Corporation, Highland Park, Mich., a corporation of Delaware Application July 12, 1951, Serial No. 236,428

5 Claims. (Cl. 74—732)

This invention relates to power transmission units adapted for use in motor vehicles or the like and is particularly concerned with the hydraulically operated control system for transmissions of the type disclosed.

It is a primary object of this invention to provide a transmission control system having speed and torque responsive, hydraulically operated, controls that include thermostatically operated means to insure proper functioning of the controls under varying temperatures of the control system operating fluid.

It is a specific object of this invention to provide a clutch mechanism shift control valve with a thermostatic control to prevent engagement of the clutch until after the operating fluid of the valve control system has attained a temperature such that the condition of the operating fluid will not interfere with proper functioning of the control valve.

It is another object of this invention to provide a pressure fluid operated control valve with thermostatically operated means to modify the action of the control valve with changes in condition of the valve operating medium.

It is still another object of this invention to provide a power transmission unit of novel design that gives maximum flexibility and performance with a minimum number of parts and a minimum effort on the part of the operator.

Other objects and advantages of this invention will become readily apparent from a reading of the following description and a consideration of the related drawings wherein:

Fig. 1 is a schematic view of a motor vehicle drive train utilizing a power transmission unit embodying this invention;

Fig. 2 is a sectional elevational view of the power transmission unit;

Fig. 3 is an enlarged fragmentary sectional elevational view of the one-way brake mechanism associated with the stator wheel of the power transmission unit torque converter device;

Fig. 4 is a diagrammatic view of the hydraulically operated control system for the power transmission unit;

Fig. 5 is a fragmentary plan view of the transmission unit drive ratio selector quadrant;

Fig. 6 is a schematic view of the drive ratio positions of the selector quadrant;

Fig. 7 is an enlarged elevational view of the transmission control system valve body;

Fig. 8 is a sectional elevational view of certain of the structure of the transmission control system valve body the view being taken along the line 8—8 of Fig. 7;

Fig. 9 is another sectional elevational view of certain of the structure of the transmission control system valve body, the view being taken along the line 9—9 of Fig. 7;

Fig. 10 is an enlarged fragmentary sectional elevational view of a portion of the transmission control system valve body;

Fig. 11 is an elevational view taken along the line 11—11 of Fig. 9;

Fig. 12 is a fragmentary sectional elevational view taken along the line 12—12 of Fig. 11; and Fig. 13 is a side elevational view of a motor vehicle power plant employing the power transmission unit and controls therefor herein disclosed.

Fig. 1 diagrammatically discloses a conventional motor vehicle power plant and drive train comprising an internal combustion type of engine E drivingly connected to a power transmission unit that consists of the hydrokinetic type of torque converter device A drivingly connected to a change speed gear box B. The output from gear box B drives a propeller shaft or drive shaft S that transmits drive through a differential unit T and axles X to the rear wheels W of the vehicle.

Fig. 2 of the drawings discloses the power transmission unit structure that consists of the hydrokinetic torque converter device A and the change speed gear box B that are arranged in a series connected drive transmitting relationship. The reference numeral 8 represents an end portion of a driving member, such as the crankshaft of the engine E of the motor vehicle power plant. The shaft 8 is drivingly connected to the somewhat axially flexible drive transmitting plate 9 by the bolt means 10. The drive transmitting plate 9 has an engine starter ring gear 11 fixedly mounted thereon and seated in a step-like formation extending about its periphery. Drivingly connected to the drive plate 9, by the screw means 12, is the torque converter casing 13. Within casing 13 are mounted the various vaned converter wheel elements, namely, the impeller or pump member 14, the turbine or runner member 15, and the guide or stator member 17.

The vaned impeller wheel 14 is formed as an integral part of the converter casing 13 and is accordingly adapted to be rotatably driven by the driving shaft 8. The vaned turbine wheel 15 is drivingly connected by rivet means 19 to a radially extending flange portion 18b formed on a shaft hub member 18a. Shaft hub member 18a is drivingly connected by splines to the forward end portion of the intermediate driven shaft member 18.

The intermediate shaft member 18 is adapted to transmit drive from the turbine member 15 of the torque converter device A to the planetary gear unit B that is arranged rearwardly of and in series with the torque converter device A. The forward end of intermediate shaft 18 is journalled in a bearing 20 that is piloted in an axially extending seat formed in the torque converter casing 13. The rear end portion of intermediate shaft 18 is rotatably supported by a sleeve plate 32 carried by the housing 42 of the gear box B.

The vaned guide wheel 17 is rotatably mounted within the converter casing 13 by means of the guide wheel hub portion 17a. Guide wheel hub portion 17a is supported by means of the one-way brake device 21, on the axially extending sleeve portion 32a of the sleeve plate 32. Sleeve plate 32 is fixed to and projects from the wall 42a of the relatively stationary gear box housing 42. The one-way brake 21 is arranged such that it will permit only forward rotary movement (clockwise when looking from the converter A towards the gear box B) to be transmitted to the guide wheel 17 by the forward rotation of the impeller 14. The brake continuously prevents rotation of the guide wheel 17 in a reverse or counterclockwise direction. The specific one-way brake 21 herein disclosed is covered by the copending application of William T. Dunn, Serial No. 205,534 filed January 11, 1951, now abandoned.

The torque converter unit A includes a gear type oil pump 25 having a driving gear 25a that is directly connected by key means 25b to the rearwardly projecting end of an axially extending flange portion 13b of the rotatable converter casing 13. The pump 25 draws oil from a supply sump 26 through supply conduit 27 and circulates this oil through the converter A, the transmission unit lubricating system and the various subsequently described, hydraulically operated control mechanisms associated with this power transmission unit (see Fig. 4). A second pump 84, driven by the transmission output shaft 81, is also included in this transmission unit. The second pump 84 provides a source of pressure fluid for the various aforementioned hydraulically operated devices at times when the engine driven pump 25 is not operating. Pump 84 will provide pressurized fluid during pushed or towed starting as well as during engine driven operation of the vehicle.

In order to provide means for transmitting a positive, two-way direct drive from the driving shaft 8 to the intermediate shaft 18 a torque converter lock-up clutch C is provided. The lock-up clutch C is mounted within the torque converter casing 13 and includes the radially extending drive transmitting disc 33 which has friction elements 33b mounted on its side faces adjacent its periphery. Drive transmitting disc 33 is drivingly connected by hub portion 33a to the intermediate shaft 18 through the shaft hub member 18a. Mounted between the disc 33 and the disc hub member 33a are several circumferentially spaced compression spring elements 34 (only one shown) that are designed to cushion the torque impact transmitted to the disc 33 on engagement of clutch C and to aid in damping vibrations of the disc 33. Pins 35 that extend through enlarged openings in the hub member 33a are also connected to the anchor plates 40. At least one of plates 40 is connected to disc 33 by suitable drive transmitting means such as rivets or the like. Pins 35 thus connect the clutch disc 33 and hub members 33a and also urge the anchor plates 40 against the sides of the hub member 33a so as to provide another means that tends to damp out vibrations of the disc 33.

The forward portion of the torque converter casing 13 provides the input or driving side of the converter lock-up clutch C. Converter casing 13 at its forward portion is formed with an axially extending piston receiving bore 36 adjacent its periphery. Mounted within the piston bore 36 is an axially shiftable, hydraulically actuated, piston 37. Converter casing 13 also supports a clutch backing plate 38 that is arranged to cooperate with the piston 37 so as to provide means to clampingly engage the friction faces 33b of clutch disc 33 when pressure fluid is admitted to the piston receiving bore 36. Pressure fluid may be introduced to the piston bore 36 through the bore 39a in the shaft member 18. Admission of pressure fluid to the piston bore 36 will move the piston 37 rearwardly so as to engage the torque converter lock-up clutch C and directly connect the driving shaft 8 to the intermediate shaft 18. On release of the pressure fluid from the piston bore in plate 36 suitable means, such as the pressure fluid within the converter casing 13, will urge the piston 37 forwardly to disengage the clutch C and provide a means for the transmission of a fluid transmitted, torque multiplying drive from input shaft 8 to intermediate shaft 18.

The gear box B includes the direct drive clutch D and the pair of planetary gear trains 50 and 60 that are adapted to cooperate with the torque converter device A to provide means for the transmission of forward and reverse drives to the propeller shaft S.

The sleeve plate 32, that is detachably mounted on the forward wall 42a of the gear box housing 42, includes a rearwardly directed, axially extending, flange 32b that rotatably supports the drum element 43 of the direct drive clutch D. Drum element 43 has an outer peripheral, axially extending, surface 43a that is adapted to be engaged by the brake band 57 to anchor the drum 43 against rotation. Drum 43 is shaped so as to provide an axially extending piston receiving bore 44. Within bore 44 is reciprocably mounted a piston 45. The drum peripheral portion 43a has drivingly connected thereto a plurality of radially extending, axially shiftable, clutch plates 46 and a backing plate 47. The drum 43 and its plates 46 and 47 normally constitute the driven side of the direct drive clutch D. The driving side of clutch D is composed of the spider element 48 that is splined at 48a to the intermediate shaft 18. Spider element 48 has a group of radially extending, axially shiftable, clutch plates 49 drivingly connected thereto and arranged so as to extend between the aforementioned clutch plates 46. An axially extending spring 40, that is concentrically arranged about the sleeve plate portion 32b, is positioned to extend between the piston 45 and an anchor ring 41 that is fixed to the portion 43b of the drum 43. Spring 40 continuously urges the piston 45 forwardly to a clutch disengaged position.

On admission of pressure fluid to bore 44 through inlet channel 39, the piston 45 will be forced rearwardly to clampingly engage the clutch plates 46, 49 between the piston 45 and backing plate 47. On release of the pressure fluid from bore 44, the piston 45 will be moved forwardly by spring 40 to its clutch disengaged position.

The forwardly positioned planetary gear train 50 that is adapted to be activated to provide means for transmitting a forward underdrive ratio through this power transmission unit gear box B includes the drum-like planet pinion carrier 51. Carrier 51 has a forward wall portion 51a that rotatably supports a plurality (only one shown) of planet pinion gears 52. A sun gear element 53 is arranged in meshing engagement with the planet pinions 52. Sun gear element 53 is carried by the backing plate member 47 of the direct drive clutch D. Accordingly, drive may be transmitted from shaft 18 through spider 48, clutch plates 46, 49 and backing plate 47 to sun gear 53 whenever clutch D is engaged. The planet pinions 52 of gear train 50 are also in meshing engagement with the annulus gear 54 that is carried by a spider element 55. Spider element 55 is drivingly connected to the intermediate shaft 18 by the splines 56. The brake band 57, that was previously mentioned in the description of the clutch D, is adapted to be applied to drum element 43a of clutch D to anchor the sun gear 53 of planetary 50 against rotation. Band 57 is applied to drum 43 by means of the servo mechanism 58 (see Fig. 4). Application of band 57 to drum 43 activates planetary gear train 50 for the transmission of a forward underdrive ratio from input shaft 18 to output shaft 81. The transmission of the forward underdrive ratio is through planetary gear trains 50 and 60 which function in a compounded relationship. The means for the transmission of this forward underdrive ratio will become more apparent after reading the description of reverse planetary gear train 60.

Rearwardly positioned, reverse drive planetary gear train 60 includes the planet pinion carrier plate 51b that is supported by the drum-like carrier element 51. Rotatably mounted on carrier plate 51b are a plurality (only one shown) of planet pinion gears 62. Planet pinion gears 62 are arranged in meshing engagement with the sun gear element 63. Sun gear 63 is drivingly connected to the intermediate shaft 18. In the construction disclosed, it will be noted that the sun gear 63 of the rear planetary gear train 60 is integral with the annulus gear 54 of the forwardly positioned planetary gear train 50. Meshing with and surrounding the planet pinion gears 62 is an annulus gear 64. Annulus gear 64 has its supporting spider element 65 drivingly connected by splines 66 to the gear box output shaft 81. A brake band 67, that encircles the rear end portion of the drum-like carrier member 51, is arranged to be engaged with carrier 51 to anchor the carrier 51 against rotation. Band 67 is applied to carrier 51 by means of the servo mechanism 68 (see Fig. 4). Application of band 67 to carrier 51, while direct drive clutch D is disengaged, will activate rear planetary gear train 60 from the transmission of a reverse drive from intermediate shaft 18 through sun and planet gears 63, 62 respectively to the annulus gear 64 which latter gear is drivingly connected to the output shaft. This specific gear box is not a part of the invention herein claimed but is covered by the application of Augustin J. Syrovy et al., Serial No. 238,646, filed July 26, 1951.

It will be noted that the gear box B has the planetary gear trains 50, 60 arranged such that the box is quite advantageous from economic, operational and production standpoints. First, the input to either the forward or reverse underdrive ratio gear trains 50, 60 respectively, is from the same input element, namely the sun gear 63. This results from the fact that the sun gear element 63 is integrally formed with the annulus gear 54. Second the output from either of the gear trains 50, 60 to the output shaft 81 is through the same element, namely the annulus gear 64. This results from the fact that the gear train 50 is compounded with the gear train 60 for the forward underdrive ratio whereas the gear train 60 operates singly for the transmission of the reverse drive. Third a single carrier drum 51 is utilized to bridgingly connect and support the pair of planet pinion carriers 51a, 51b. Fourth, the gearing arrangement is such that similar gears are used as pinion gears in each of the two gear trains 50, 60. This is quite advantageous from a manufacturing and assembly standpoint.

With the power transmission unit herein disclosed it is possible to initiate forward drive through either of two torque multiplying, forward drive ratios both of which are automatically convertible into a positive, two-way, one-to-one direct drive. The final positive direct drive is not transmitted through the fluid of the torque converter A, therefore the slip of the torque converter is eliminated, thus an improved fuel economy as well as improved engine braking is available in the cruising direct drive range.

The two forward drive ratios available for initiating forward drive with this power transmission unit will for the sake of convenience be referred to as the High (H) and the Low-High (LH) ratios. Low-High is normally used when an exceptionally fast getaway is desired as when crossing a busy intersection, or the like. High is preferably used for all normal forward starting drive where the exceptionally fast Low-High acceleration is not absolutely necessary. However, even when starting through the High ratio the torque multiplying effect of the converter A is available for initiating drive and this accelerating effect is more than adequate to meet all normal requirements, particularly when such a power transmission unit is driven by one of the current high powered motor vehicle engines.

When forward drive is to be initiated through the High ratio the torque converter lock-up clutch C is disengaged, the planetary direct drive clutch D is engaged, and both brake bands 57 and 67 are in disengaged positions. With the power transmission unit so conditioned, as the engine driven shaft 8 is speeded up a hydraulically generated, torque multiplying drive is transmitted from the converter turbine driven shaft 18 to the sun gear 53 of the forward planetary gear train 50 due to the drive clutch D being engaged. This same torque multiplying drive is transmitted to the annulus gear 54 of gear train 50 due to annulus gear 54 being fixed to shaft 18. Gear train 50 is locked up and therefore planet carrier 51 rotates at the speed of shaft 18. Sun gear 63 of gear train 60 is fixed to shaft 18 so it rotates at the same speed as the planet pinion carrier 51b of gear train 60 and thus gear train 60 is locked up so output shaft 81 rotates at the speed of shaft 18. Acceleration through this torque converter generated, torque multiplying ratio continues until certain output shaft speed and torque conditions are attained and then the transmission control system, that is shown in Fig. 4 and subsequently described, automatically effects engagement of the torque converter lock-up clutch C. Upon engagement of lock-up clutch C the driving shaft 8 is directly connected to the shaft 18, and as shaft 18 is already directly connected to the output shaft 81 by the engaged direct drive clutch C, it is obvious that the power transmission unit is now positively transmitting drive at a 1:1 ratio through mechanically connected driving elements that will not slip during either power or coast drive or during engine braking. As the torque multiplication factor of the converter unit A is in the nature of 2.5 to 1 at stall, it is obvious that this ratio times an axle ratio of 3.3 or 3.9 to 1 gives an overall accelerating ratio of between 8.25 or 9.75 to 1. Such overall ratios are more than adequate for normal acceleration with the powerful engines now used in motor vehicles.

Whenever forward drive is to be initiated through the Low-High ratio both clutches C and D are initially disengaged and braking band 57 is applied to the drum portion 43a to anchor the sun gear 53 of forward drive planetary gear train 50. With sun gear 53 anchored against rotation the gear train 50 is activated and shaft 18 causes the annulus 54 to drive the pinion gears 52 and the pinion gear carrier 51 forwardly or clockwise. As a result of carrier 51 rotating clockwise the several planet pinions 62 of gear train 60 are carried forwardly and at the same time shaft 18 is driving the sun gear 63 of gear train 60 forwardly so a compounded forward drive is transmitted to the annulus gear 64 that is drivingly connected to the output shaft 81. Acceleration through the combination fluid and mechanically generated, torque multiplying, Low-High drive train continues until certain output shaft speed and torque conditions are achieved and then the transmission control system, subsequently described, causes the torque converter lock-up clutch C to be automatically engaged to provide for the direct transmission of drive from shaft 8 to shaft 18 to the input sun gear 53 of the forward drive planetary 50. Acceleration after the converter clutch C is engaged is thereafter by way of the compounded mechanical torque multiplying gear trains 50, 60. At some other predetermined conditions of output shaft speed and torque, the transmission control system (Fig. 4) causes the band 57 to be disengaged from drum 43a and the planetary direct drive clutch D to be engaged to then convert the mechanically generated, torque multiplying forward underdrive into a positively connected, two-way, direct drive. Release of band 57 and engagement of clutch D provides for the transmission of a positive 1:1 ratio forward direct drive from input shaft 8 through clutch C to the intermediate driven shaft 18 which latter shaft is directly connected to the output shaft 81 by the direct drive clutch D. With the Low-High forward drive ratio hereinabove described, it is possible to get exceptional accelerating power for the torque multiplication ratio of about 2.5 to 1 of the converter is combined with the torque multiplying ratio of approximately 1.62 of the compounded planetary gear trains 50, 60 and these ratios combine with the axle ratio of 3.3 or 3.9 to 1 to give an overall starting ratio of between 13.4 and 15.8 to 1. It is thought to be quite obvious why the Low-High ratio gives rocket-like acceleration when associated with some of the current motor vehicle engines.

Reverse drive may be obtained by applying brake band 67 to the carrier member 51 of the reverse planetary gear train 60, the clutches C and D and band 57 being disengaged at this time. Drive from input shaft 8 is then transmitted through the torque converter A to turbine driven intermediate shaft 18. Shaft 18 drives the sun gear 63 of the reverse planetary train 60 forwardly while carrier 51 is being held by brake band 67 therefore a combination fluid and mechanically transmitted torque multiplying reverse drive is transmitted to the annulus gear 64 of gear train 60. As annulus 64 is directly connected to the output shaft 81, a combination fluid and mechanically generated, torque multiplying reverse drive is transmittable from the input shaft 8 through the converter A and gear train 60 to the output shaft 81 when band 67 is applied to carrier 51.

Drivingly connected to the output shaft 81 (see Fig. 2) by the pin 82 is a driving gear 83 of the rear oil pump 84.

Oil pump 84 is arranged to draw fluid from the oil sump 26 through conduit 28 and to circulate the discharged pressurized fluid through the torque converter A and the hydraulically operated control and lubrication systems of the transmission unit. As aforementioned, pump 84 is operative whenever the output shaft 81 is rotating above a predetermined speed. Suitable valving such as the valve unit 185 shown in Fig. 4, is provided to insure that pump 84 automatically takes over the supply of pressure fluid for the transmission unit and its control system whenever the speed of output shaft 81 exceeds a certain predetermined relatively low value. This relieves the transmission driving engine of the load of front pump 25 after the engine unit A has begun to drive the transmission output shaft 81. This valving is described in the co-pending application of William L. Sheppard, Serial No. 98,493, filed June 11, 1949, now Patent No. 2,697,363.

Also drivingly mounted on the output shaft 81 (see Figs. 2 and 4) is a speed responsive, centrifugal force operated, governor mechanism 85 which provides one of the means for automatically controlling operation of this power transmission unit. It is obvious that various types of vehicle speed responsive controls may be used with this transmission but the specific governor mechanism 85 herein disclosed is particularly advantageous due to its simplified design and novel manner of operation. This governor unit is arranged such that it does not require shaft driven gearing or electrically operated control units but instead uses hydraulic pressure supplied by the rear pump 84 in combination with the centrifugal force effect of a pair of output shaft mounted telescopically arranged weights 88, 89 for controlling actuation of the radially movable governor control valve 95 so as to provide a novel type of pressure fluid operated, output shaft speed responsive governor mechanism. This governor mechanism 85 is completely described in the aforementioned co-pending application of William L. Sheppard, Serial No. 98,493, filed June 11, 1949, now Patent No. 2,697,363.

While the pressure of the fluid discharged from the pump 84 into the governor inlet passage 97 is almost constant and also greater than the pressure of the fluid discharged from the governor mechanism into the outlet passage 98, due to the reducing valve action of governor piston valve 95, still, it will be found that the pressure of the fluid discharged from the governor 85, hereafter denoted governor pressure, is roughly proportional to the speed of the output shaft 81. Governor 85 thus provides an efficient, accurate, simplified form of speed sensitive control mechanism.

The control system (see Fig. 4) for this transmission includes the manually operable drive selector lever 111 which is rotatably mounted on the conventional motor vehicle steering column 112. Control lever 111 is connected by suitable linkage 113 to the manually operable drive ratio selector valve 170. Valve 170 has five drive ratio positions which are represented in the drawings by the letters R, N, H, LH, and L, respectively. These letters correspond to the Reverse, Neutral, High, Low-High and Low ratios which ratios are selectively obtainable by manual shift of selector lever 111. The letter V associated with the valve 170, and with the other valves of this control system, denotes a vent or drain port for returning pressure fluid to the supply sump 26. Pressure fluid from either of the supply pumps 25 or 84 is directed into the main supply conduit 191 which is connected to the manually operable drive ratio selector valve 170. The pressure of the fluid in supply conduit 191 is controlled by the pressure regulator valve 185 and this controlled pump supplied pressure is denoted "line" pressure for purposes of description hereafter. Check valves 183 and 184 maintain a closed pressure fluid supply system. On admission of line pressure fluid to the bore 171 of drive ratio selector valve 170 certain of the control mechanisms associated with the control system will be energized and one or the other of the several aforementioned drive ratios will be transmitted from shaft 8 to output shaft 81. When the manual valve 170 is located in the Neutral position the valve land 173 closes off the port 172 connecting supply conduit 191 to valve bore 171 and obviously line pressure fluid cannot pass through valve 170 to activate any of the drive ratio selector mechanisms. However, it should be noted that even when the manually controlled valve 170 is placed in the Neutral position with the vehicle engine running or when the vehicle is being pushed or towed so that one or the other of pumps 25 or 84 is operating, then line pressure fluid will be directed through conduit 191 to the pressure regulator valve 185 and through valve 185 to the conduit 193 that supplies pressure fluid to the converter A. Conduit 193 may contain a converter fluid pressure regulator valve 195 to control the pressure of the fluid directed into the converter A. Pressure fluid passing through converter A is returned to sump 26 and to the transmission lubrication system by the conduit 194 that has associated therewith the radiator-type converter fluid cooling unit 196. The converter pressure regulator valve 195 preferably maintains a pressure of approximately 40 to 50 p. s. i. in the converter so that the clutch C may be easily operated by normal line pressure of 80–90 p. s. i. in bore 36.

In either of the forward drive ratio positions H, LH, or L of the selector valve 170, line pressure fluid from supply conduit 191 will always be directed through the supply port 172 of valve 170 and into the conduits 119, 119a that connect the manual drive ratio selector valve 170 with the torque responsive throttle valve 120. Consequently a torque responsive control is always available to cooperate with the speed responsive governor 85 to control automatic operation of this transmission unit in all forward drive ratios.

The torque responsive throttle valve 120 (see Fig. 4) has operably associated therewith a kickdown valve-controlled mechanism 230 that is hereinafter described. The torque responsive throttle valve 120 is operated by linkage connected to the throttle control or accelerator pedal 115 for the engine unit E that drives the power transmission unit. Pedal 115 is connected to the piston type throttle valve element 121 of valve unit 120 by the linkage 116. Throttle valve unit piston 121 is arranged to reciprocate in the bore of the valve unit 120 and is connected to the accelerator pedal 115 through a compression spring 124. At closed or idle throttle position of the accelerator pedal 115 with the manual control valve 170 set for any of the forward drive ratios, H, LH or L, the arrangement of valve 120 is such as to supply conduit 125 and branch conduits 125a, 125b and 125c with a low pressure fluid derived from the aforementioned line pressure fluid supply conduits 191 and 119a. This reduced or compensated line pressure in conduits 125, 125a–c, is denoted "throttle" pressure. Admission of throttle pressure fluid to branch conduit 125a applies a pressure to the left end of the valving 131 of the compensator valve 130. Valving 131 has governor pressure from conduit 133 applied to its right end so as to oppose the aforementioned throttle pressure. Line pressure in conduits 119b and 119c is applied to the compensator valve 130 and is passed therethrough in a modified form. The modified or compensated line pressure that leaves valve 130 by way of conduit 134 is applied to the chamber 58b of servo 58. The pressure fluid in conduit 134 is called the band applying compensated pressure fluid and its introduction to the chamber 58b on the apply side of servo 58 tends to cause application of brake band 57 to drum member 43a to condition the transmission unit for the accelerating, combination fluid and mechanically generated, torque multiplying Low-High underdrive. Torque converter lock-up clutch C is disengaged at the beginning of all forward drive because the position of converter lock-up clutch shift valve piston 161 at closed or idle throttle is such as to prevent line pressure fluid from conduit 119a from entering conduit 156 to effect engagement of the converter lock-up clutch C.

As the accelerator pedal 115 is depressed from its closed or idle throttle position to initiate vehicle acceleration through the Low-High ratio, the throttle valve 121 is urged towards the left. This accelerator movement on throttle opening is transmitted by spring 124 to throttle valve 121 which latter valve is moved to the left a sufficient amount to permit pressure fluid from conduit 119a to pass through the bore 123 of the valve 120 and to supply throttle pressure fluid to conduits 125, 125a, 125b and 125c. The throttle pressure fluid admitted to bore 123 from supply conduit 119 on partial depression of the accelerator pedal 115 is of a lower pressure than the line pressure in conduit 119 due to the reducing valve action of the valving of the throttle valve 120. At wide open throttle with pedal 115 substantially depressed there is substantially a direct connection between conduit 119 and the conduit 125 consequently the throttle pressure in conduit 125 will equal the line pressure in conduit 119a. The admission of throttle pressure fluid to bore 123 of valve 120 has a tendency to shift the throttle valve 121 to the right to oppose leftward movement of the valve 121 by depression of the accelerator pedal 115. This results from the fact that a by-pass bore 121a connects the main bore 123 with a closed chamber on the left end of valve 121 so the throttle pressure fluid in bore 123 is applied to the left end of valve land 121 and tends to urge the valve 121 to the right to balance the force being applied to the right end of valve 121 by the accelerator pedal 115.

The throttle pressure fluid admitted to conduits 125, 125b is directed into valve chamber 143 of the automatic control valve unit 140 for direct drive clutch D and into the chamber 163 of the automatic control valve unit 160 for the converter lock-up clutch C. The throttle pressure in chambers 143 and 163 assists the springs 144 and 164 in urging shift valves 141 and 161 towards the right end of valve units 140 and 160 which positions are the downshifted positions of the valves 141 and 161. Thus during initial depression of accelerator pedal 115 the valve lands of shift valves 141 and 161 are positioned so that they cover the line pressure inlets 149, 169 from supply conduits 119d and 119e respectively. This prevents line pressure from supply conduit 119a from passing through the clutch control valves 140 and 160 and into conduits 155 and 156 respectively to effect engagement of the converter lock-up clutch C and the direct drive clutch D. Conduit 155 includes a branch conduit 155b that is adapted to transmit line pressure (approximately 90 p. s. i.) to the chamber 58c on the band release side of the servo 58 that controls the forward drive planetary gearing 50. Thus it will be seen that the positions of the shift valves 141 and 161 control engagement and disengagement of the converter lock-up clutch C and the direct drive clutch D as well as the engagement and disengagement of the activating brake band 57 of the forward drive planetary gearing 50.

Conduit 155 also includes a branch conduit 155a that is connected to the compensator valve unit 130. Line pressure passed to compensator 130 by conduit 155a assists in effecting quick engagement of the planetary brake band 57 during downshifts or on kickdowns from direct drive.

After the drive ratio selector valve 170 has been moved from the Neutral position to the selected High or Low-High position for initiating forward drive, the control valving will have applied the appropriate clutches and/or bands and then depression of the accelerator pedal 115 will cause drive to be transmitted to the output shaft 81. Until a pressure fluid such as governor pressure or line pressure, or the like is applied to the right ends of the pilot valves 145 and 165, the shift valves 141 and 161 cannot be shifted to the left to their upshifted positions. However, as the output shaft 81 begins to gain speed, due to depression of accelerator 115, a variable governor pressure is directed to the governor pressure supply conduit 133 and this governor pressure in conduit 133 is applied to valves 140 and 160 in such a manner as to attempt to bring about leftward movement of these valves to cause upshift of the clutch shift control valves 141 and 161. Thus governor pressure in conduit 133 will tend to apply a fluid pressure generated upshifting force to the right end of each of the clutch pilot valves 145 and 165. Pilot valves 145 and 165 are reciprocably mounted in chambers 146 and 166 at the right ends of valve units 140 and 160 respectively and are adapted to be moved leftwardly into engagement with the shift valves 141 and 161 to effect upshift of valves 141 and 161 towards the left. Due to the governor pressure compensator 210 and its associated selector valve 220 it is possible to apply different pressures to the pilot valve chambers 146 and 166 at the right ends of valves 140 and 160 and thus have different points of engagement for the converter lock-up clutch C and the direct drive clutch D when drive is initiated through the Low-High drive ratio. This is necessary when the transmission is set for the Low-High forward drive ratio for it is advantageous to have the torque converter clutch C lock-up the torque converter at a lower speed than that which effects lock-up of the direct drive clutch D of the planetary gearing 50. By this arrangement a step-by-step upshift through the converter A plus gear train 50, then through gear train 50 alone, then through the positive one-to-one direct drive.

The governor pressure compensator 210 is arranged to function in such a manner that it modifies the line pressure transmitted to the compensator 210 by the conduit 209. Instead of applying governor pressure from conduit 133 directly to the pilot valve chamber 166 at the right end of converter lock-up clutch control valve 160, it is possible, by virtue of the compensator 210 and valve 220, to apply either direct governor pressure or a higher modulated or compensated governor pressure, that is proportional to the governor pressure, to the pilot valve chamber 166 of converter clutch control valve 160. These two different pressures that are applied to the pilot valve 165 of valve 160 bring about two different points at which the converter lock-up clutch C will be engaged depending on whether the manual drive ratio selector valve 170 is set for the Low-High ratio or the normal forward starting High ratio. The reason for the two different engagement points of converter lock-up clutch C is that when the transmission is set for High the complete torque multiplication of the power transmission unit must be supplied by the converter A alone, due to the fact that multiplying gearing 50 is locked up during use of the High ratio. Accordingly, it is advantageous to have the converter A active over a longer period of time in the High ratio than when the transmission is set for the Low-High ratio where the gearing 50 will provide some torque multiplication even after the converter A has been locked up by engagement of the lock-up clutch C. Thus a relatively low pressure, that is, direct governor pressure is applied to the pilot valve 165 to effect leftward shift thereof when operating in the High ratio whereas when operating in the Low-High ratio the compensator 220 applies a relatively high compensated line pressure from conduit 209 to the pilot valve 165 to effect upshift thereof. Obviously when the higher compensated governor pressure is applied to valve 165, the upshift to lock-up converter clutch C will occur at a lower vehicle speed than when the lower governor pressure is used to effect the lock-up of converter clutch C and thus the converter A is active over a shorter period in the Low-High range than in the High range.

A brief description at this point of the compensator 210 and the associated valve 220 will undoubtedly facilitate an understanding of the aforementioned operation of the control system for this transmission in the several forward drive ratios. When manually operable drive ratio selector valve 170 is set for initiating drive through the High ratio then valve 170 admits line pressure fluid (approx. 90 p. s. i.) from supply conduit 191 to conduits 119 and 219. Line pressure fluid in conduit 119 passes through the throttle valve 120 to the left end of valves 140 and 160 as previously explained. Line pressure in conduit 219 will pass through valve 220 and into conduit 133c so as to upshift valve 140 and apply clutch D. Upshift of valve 140 will also release band 57 of planetary 50 to condition the transmission for the High ratio as previously explained. With line pressure in conduit 219 and the ball type valve 220 closing the pressure fluid inlet port at the left end of valve 220, the governor pressure, which varies from approximately 0–90 p. s. i. depending on the speed of output shaft 81, will pass from conduit 133 through the governor pressure compensator 210 and into conduits 133a, 133b and 133d. Conduits 133a and 133b direct the governor pressure fluid into the right end of compensator valve 130. Conduit 133d directs the governor pressure into the pilot valve chamber 166 at the right end of converter clutch control valve 160. Governor pressure fluid in the pilot valve chamber 166 of valve 160 tends to urge the pilot valve 165 and converter lock-up clutch shift valve 161 towards the left to effect lock-up of the converter C. As throttle pressure, which varies from 0–90 p. s. i. is already being directed into the shift valve chamber 163 at the left end of control valve 160, it is obvious the shift valve 161 will not shift over to the left to effect engagement of converter lock-up clutch C until after the governor pressure in the pilot valve chamber 166 at the right end of valve 160 exerts a greater leftwardly directed force on shift valve 161 than the rightwardly directed force of the throttle pressure in chamber 163. It will be noted that the diameter of the pilot valve 165 is greater than the diameter of the shift valve 161 therefore when the throttle pressure in chamber 163 is equal to the governor pressure in chamber 166, still a shift of valve 161 to the left will occur. Once the valves 161 and 165 begin to shift towards the left then the by-pass conduit 168 transfers throttle pressure to the right end of pilot valve 165 and a snap-action upshift is effected that prevents hunting of the valves 161 and 165 and provides a very definite engagement point for the converter lock-up clutch C. This particular snap action valve control is more fully explained in the aforementioned copending application of William L. Sheppard, Serial No. 98,493, filed June 11, 1949, now Patent No. 2,697,363.

It is thought to be obvious that once shift valve 161 moves to the left then line pressure from conduit 119d can pass through valve bore 163 of valve 160 and into conduit 156 which directs this line pressure fluid through conduit 156a into the converter lock-up clutch C to effect engagement of clutch C. Line pressure from conduit 156 also enters branch conduit 156b and is directed into the converter pressure regulator valve 195 so as to reduce the pressure within converter casing 13 during converter clutch lock-up. The reduction of the pressure within the casing 13 permits an increase in the clutch applying force for clutch C.

From the description above it is thought to be apparent that the torque responsive throttle pressure in chamber 163 of control valve 160 and the speed responsive governor pressure in the chamber 166 of valve 160 conjointly control the automatic engagement and disengagement of the converter lock-up clutch C. Obviously the points for lock-up of the clutch C will vary depending on the particular relationship existing between the speed and torque conditions of the output shaft 81. When operating in the High ratio at wide open throttle, that is with a large torque load on shaft 81, the lock-up of clutch C might not occur until the vehicle speed has reached 50–55 miles per hour, whereas at light throttle under a light torque load, the clutch C could be automatically engaged at about 14–16 miles per hour vehicle speed. The automatic disengagement of clutch C would normally occur when the vehicle speed has been reduced to approximately 10–14 miles per hour. The various shift points can be adjusted to meet the particular desires of the operator by making certain changes in the valving that are thought to be rather obvious.

If while operating in the High ratio at a relatively high vehicle speed and light torque load such that the clutch C is engaged and the transmission is transmitting the positive direct drive, the vehicle operator should desire to accelerate in a torque multiplying ratio, it is merely necessary for the operator to fully depress the accelerator pedal 115 and this will operate suitable valving to manually overrule the automatic control of the clutch C and disengage the converter lock-up clutch C so that the converter A is then brought back into operation to provide a torque multiplying drive. This manual kickdown from the positive one-to-one direct drive to a fluid transmitted torque multiplying drive ratio is accomplished by means of the kickdown valve 230 and its associated elements which are controlled by the accelerator pedal 115. Linkage 116 of the accelerator 115 carries a finger-like projection 116a that is adapted to be engaged with plunger rod linkage 117 to open the plate-like relief valve 231 of the valve unit 230, after a predetermined depression of the accelerator 115. As the accelerator 115 is fully depressed, the last 5 or 10 degrees of its downward or throttle valve opening movement causes the linkage 117 to engage and open the valve 231. Opening of valve 231 bleeds off the governor pressure fluid in the pilot valve chamber 166 of converter lock-up clutch valve 160 and this reduces the forces holding valve 161 in the upshifted position. This permits the pilot valve 165 and shift valve 161 for the torque converter lock-up clutch C to downshift to the right to effect disengagement of the clutch C and to simultaneously activate the converter A. The shift to the right of valves 161 and 165 is accelerated by the increased throttle pressure applied to the chamber 163 at the left end of valve 160 due to the full depression of the accelerator 115. Obviously, on release of the accelerator 115 the spring 235 of kickdown valve unit 230 will shift kickdown valve 231 to the right to its normally inactive position and the transmission control system will be returned to its automatically controllable condition.

On kickdown with the drive ratio selector lever 170 set for the High ratio, it will be noted that the leftward shift of kickdown valve 231 permits each of conduits 242 and 243 to be connected to the kickdown valve 231. This reduces the force holding both the direct clutch shift valve 141 and converter lock-up clutch shift valve 161 in their upshifted or leftward positions. However, due to line pressure being applied to the chamber 146 at the right end of valve 140, when the transmission is set for High, the shift valve 141 and pilot valve 145 are held in their upshifted positions even though the pressure in conduit 243 is reduced. This maintains the transmission in the selected High ratio with direct clutch D engaged.

If the manually operable drive ratio selector lever 111 is set for initiating drive in the Low-High drive ratio then line pressure fluid of approximately 90 p. s. i. will be directed from supply conduit 191 into conduits 119 and 209 respectively. Line pressure that is directed into conduit 119 passes the throttle valve 120 and is directed by conduits 119b and 134 to the servo 58 and by conduit 119a to the left ends of the valves 140 and 160 respectively. Servo 58 is thus caused to apply the band 62 and this activates gear train 50 for the transmission of a torque multiplying forward underdrive. The line pressure fluid in conduit 119a remains inactive until the valves 161 and 141 are successively upshifted towards the left to effect step-by-step engagement of the converter lock-up clutch C and the direct drive clutch D. The successive step-by-step engagement of the clutches C and D is brought about by the line pressure fluid admitted to conduit 209 when the drive ratio selector valve 170 is set for Low-High drive. Line pressure in conduit 209 is directed to the governor compensator unit 210 and is modulated by the compensator 210 so that a modulated or compensated pressure fluid is passed through the compensator 210 to the conduits 133b and 133d. The modulated pressure transmitted through compensator 210 to conduit 133d and to the pilot valve 165 for the converter lock-up clutch C is directly proportional to but greater than the currently existing governor pressure which exists in the conduit 133. With valve 170 set for Low-High the conduit 219 is not pressurized with line pressure and the governor pressure (0–90 p. s. i.) in conduit 133 will force the ball valve element 220 to the right so that governor pressure can pass from conduit 133 through valve 220 into conduit 133c and be applied to the right end of pilot valve 145 of the direct clutch control valve 140. Thus in the Low-High ratio throttle pressure (0–90 p. s. i.) is applied to the left ends of shift valves 141 and 161 while governor pressure and an increased, compensated governor pressure are applied to the right ends of the pilot valves 145 and 165 respectively. As the compensated governor pressure applied to pilot valve 165 is greater in value than the governor pressure applied to pilot valve 145, the shift valve 161 will be upshifted to the left to effect engagement of converter lock-up clutch C at a lower vehicle speed than the speed at which the shift valve 141 is upshifted to effect engagement of the direct drive clutch C. This causes lock-up of the converter C first and thereafter release of gear train brake band 57 and engagement of clutch D so as to give the two step upshift to the positive one-to-one direct drive from the combination fluid and mechanically generated, torque multiplying Low-High forward starting drive ratio.

While traveling in the positively connected one-to-one direct drive ratio with the drive ratio selector valve 170 set for Low-High, the vehicle operator can also manually overrule the automatic control system and kickdown to a torque multiplying underdrive ratio at any time the vehicle speed is below approximately 55 miles per hour. The kickdown is effected in the same manner as already explained with regard to the kickdown when traveling in the High ratio. A full depression of accelerator pedal 115 will cause lever 117 to shift kickdown valve 231 to the left and this will connect conduit 243 to relief valve 231. Reduction of the throttle pressure in conduit 243 permits direct clutch shift valve 141 and pilot valve 143 to shift to the right to effect release of clutch D and to simultaneously engage the brake band 57 of planetary gearing 50 through actuation of the servo 58. This conditions the transmission gear box C for the torque multiplying, forward underdrive ratio through compounded gear trains 50, 60. The reduction of the pressure of the fluid in conduits 242 and 243 by the opening of kickdown valve 231 when the transmission is set for Low-High is not a sufficient pressure reduction to overcome the effect of the relatively high compensated pressure in chamber 166 of converter clutch control valve 160. Accordingly, converter lock-up clutch shift and pilot valves 161 and 165 do not downshift to the right when direct drive clutch D is released on kickdown thus the converter lock-up clutch C remains engaged and the kickdown in Low-High is to a positively connected forward underdrive gear train that does not pass through the fluid of the torque converter. Due to this fact there is substantially no slip in this kickdown ratio as might be the case with a kickdown through the torque converter and a positively connected gear train for acceleration, as well as coast braking, is available. Upon release of the accelerator 115 it is obvious that the automatic speed and torque responsive controls of the transmission will immediately take over operation of the transmission unit.

In the operation of this transmission in the Low-High ratio the shift points are somewhat different from those when operating in the High ratio for the converter A does not have to remain active for as long a time in the Low-High ratio due to the gear train 50 being available to provide a part of the torque multiplication after lock-up of the converter. At wide open throttle the converter lock-up clutch C might engage at 15–32 miles per hour vehicle speed and the direct drive clutch D could engage at speeds up to 63 miles per hour vehicle speed. At light throttle or low torque load the converter lock-up clutch C might engage at 13–15 miles per hour and the direct drive clutch D would engage at 18–20 miles per hour vehicle speed. Automatic disengagement of the direct drive clutch D could occur at approximately 13 miles per hour vehicle speed while the converter lock-up clutch C would be disengaged at about 11 miles per hour.

If while operating in either the High ratio or the Low-High ratio, it should become advantageous or necessary to employ a coasting gear for coast braking, it is merely necessary to manually move the drive ratio selector lever 111 to the Low position. This conditions the transmission for the positively connected underdrive ratio that is also obtained when driving through the Low-High ratio. As the vehicle speed is relatively high and the torque load low on coast drive, the converter lock-up clutch C will be applied while the direct drive clutch C will be held disengaged with brake band 57 applied by servo 58. This provides a positively connected underdrive ratio for the coast braking. This ratio will not slip and it will provide an adequate braking effect on coast drive. The Coast ratio may be manually shifted back into either of the forward drive ratios H or L-H when the coast braking effect is no longer required. In the Low ratio the control valving is initially set the same as with the Low-High ratio for the selector valve 170 still admits line pressure from supply conduit 191 to conduits 119 and 209. In addition line pressure is now admitted to conduit 241 which conducts this pressure fluid to chamber 148 of the direct drive clutch valve 140. Line pressure in chamber 148 of valve 140 forces pilot valve 145 to shift to the right and causes that shift valve 141 to stay downshifted. Pressure fluid in valve chamber 148 locks the direct drive clutch D in its disengaged position and causes application of the brake band 57 to the brake drum element 43a to activate the underdrive gear train 50 for use as a coast braking ratio.

Reverse drive is obtainable by shifting the manually operable drive ratio selector valve 170 to the Reverse position (R). This pressurizes conduits 209, 241 and 245 with pressure fluid from supply conduit 191. Pressure fluid is not admitted to conduits 119, 219 and 246 when in Reverse drive. Due to the lack of line pressure fluid in conduit 246 the pressure regulator valve 185 now establishes a line pressure of approximately 180 p. s. i. in the control system instead of the 90 p. s. i. that is utilized for the forward drive ratios. The increased pressure in the control system during Reverse drive is advantageous because of the increased torque reaction when operating in the 2.6 to 1 Reverse drive ratio. The conduit 245 conducts the increased line pressure fluid to the chamber 68a of the reverse gear train servo 68 to apply reverse brake band 67 and condition the planetary gearing 60 for the transmission of a torque multiplying Reverse drive from the converter A to the output shaft 81. This specific servo 68 is completely described in the co-pending application of William L. Sheppard, Serial No. 211,300, filed February 16, 1951, now Patent No. 2,633,712. As the controls for the clutches C and D as well as the forward drive servo 58 are not pressurized when Reverse drive is transmitted it is thought to be obvious that there is no upshifting or downshifting when operating in the Reverse drive ratio.

The several valves that have been described as forming parts of this transmission control system are contained within a valve body unit 300 (see Figs. 7, 8 and 9) that is mounted by means of its support plate 301 in the underside of the transmission gear box housing 42 (see Fig. 2). As valve body 300 is within the oil sump pan 302 of the housing 42, it is obvious that the oil vented from the valve body 300 is discharged into the oil sump 26 such that it may pass through strainer unit 304 and be recirculated by the pumps 25 and 84 in an obvious manner.

It has been found that at times when initiating operation of this transmission unit in an extremely cold climate, the transmission lubricating oil that is also the control system pressure fluid medium, may be of such a thick, congealed nature that it has a tendency to interfere with proper functioning of the transmission. This difficulty has been found to result from the means utilized to effect engagement and disengagement of the torque converter lock-up clutch C. In particular, it has been noted that on initial operation of the transmission before the transmission lubricating oil has been warmed to a sufficient degree to be of a readily flowable character, that the converter lock-up clutch C does not disengage automatically when bringing the vehicle to a stop. As a result the direct connection between the output shaft 81 and the input shaft 8 tends to stall the engine E or cause slip in the clutch C that may damage the clutch plates or other associated parts. Furthermore, the transmission will remain in a positively connected drive transmitting condition at a time when the slip in the converter should be absorbing the driving torque of the vehicle engine E.

As a result of a study of this problem, it has been ascertained that this difficulty arises from the fact that for normal automatic disengagement of the converter lock-up clutch C, the throttle pressure fluid directed into the chamber 163 at the left end of valve unit 160 (see Fig. 4) must exert a sufficient rightwardly directed force on the shift valve 161 to overcome the leftwardly directed force of the governor pressure fluid being applied to the pilot valve 165 at the right end of valve unit 160. As previously pointed out the effective area of pilot valve 165 is greater than the effective area of shift valve 161 so the force of the throttle pressure in chamber 163 must be considerably greater than the currently existing governor pressure in chamber 166 in order to insure a rightward shift of the valving of converter lock-up clutch valve unit 160 and an accompanying disengagement of clutch C. On coast drive, as when coming to a stop, the throttle is released to idle position usually and thus the throttle pressure is relatively low. If at the same time the oil that is being circulated through the control system is quite thick and not readily flowable, it may not be possible to build up sufficient force in chamber 163 to effect the downshift of the valving of valve unit 160 and the disengagement of converter lock-up clutch C.

The structural arrangement hereafter described provides a means for satisfactorily overcoming the aforementioned difficulty by providing mechanism that prevents engagement of the converter lock-up clutch C until after the pressure fluid circulating throughout the control system has been brought to such a temperature that it may readily flow through the transmission control system and operate the various mechanisms, including the converter lock-up clutch C, in their intended manner. By preventing engagement of the converter clutch C until the control fluid is readily flowable, it is obvious that interference with disengagement of the clutch C can never present a problem. Furthermore, the fact that the converter can not lock-up on initiation of all driving does not adversely affect the transmission operation for the converter will merely function as a torque converter or a simple fluid coupling and transmit torque in its normal manner. As the control system pressure fluid is quickly heated by operation of the transmission, it should be realized that the clutch C is rendered inoperative for only a relatively short period of time when the weather conditions are extremely cold.

Figs. 9, 10, 11 and 12 show the valve body structure 300 with the thermostatic control element 310 incorporated therein so as to provide a means for preventing engagement of the converter lock-up clutch C until after the control system pressure fluid is of the required temperature and viscosity. Valve body 300 includes a removable cover or end plate 305 that has recesses 143 and 163 therein forming the valve bores adapted to receive the left ends of the shift valve 141 and 161 respectively. The cover plate recesses 143 and 163 are each provided with a depressed seat formation to receive a shift valve return spring 144 and 164 respectively. Mounted on the inside of the valve body cover 305 by means of a bolt and nut connector 306 is a bimetal type of actuator strip 311 for the shift valve blocker element 312. From the position of the control element actuator strip 311 within the valve body cover 305, it is thought to be obvious that the strip 311 will be continuously immersed in the pressure fluid circulated through the transmission control system and thus it will be directly affected by the temperature of the pressure fluid of the control system.

The bimetal strip actuator 311 is mounted as a cantilever beam from its support 306 on cover 305 and it has its free end 313 positioned in the recess 163 adjacent the outer end of shift valve 161. Bimetal actuator strip 311 is designed such that at relatively cold temperatures of the fluid in the transmission control system, the strip 311 will curl or bend to the position shown in broken lines in Fig. 11. When bent to this low temperature position the blocker element 312, carried by the free end of strip 311, is positioned as shown in Fig. 10. In such a position the blocker element 312 extends between the wall of cover plate 305 and the outer end of the converter lock-up clutch shift valve 161 and it is impossible for the transmission control system to force shift valve 161 towards the left (see Fig. 4) to accomplish the valving rearrangement that would engage the converter clutch C. Blocker element 312 is preferably made of some rather hard wear resistant material for obvious reasons. As the pressure fluid in the transmission control system is warmed to a predetermined temperature that approaches the normal operating temperature of the control system fluid, the bimetal strip 311 will automatically straighten itself and assume the position shown in full lines in Figs. 10, 11 and 12.

It is thought to be obvious that the thermostatic control 310 herein disclosed will overcome the possibility of the converter lock-up clutch shift valve 161 sticking in its clutch engaged position due to cold, high viscosity fluid in the transmission control system interfering with the normal operation of the control system valving. As the normal operating temperature of the control system fluid is such as to straighten the actuator strip 311 to the full line position shown in Figs. 10-12, it is clear that normally the thermostatic valve control element 310 is in a position where it has no effect whatever on the operation of the valving of the transmission control system.

While a specific form of thermostatic control 310 has been disclosed, it is to be understood that other forms that would be mechanical equivalents thereof are within the scope of this invention as defined by the appended claims. Furthermore, while the thermostatic control 310 is shown applied to the converter lock-up clutch valving 160 only, it is obvious that it can be applied to any of the other control valves as well and such is intended to be within the scope of this invention.

I claim:

1. In a power transmission unit comprising a fluid operated power transmitting device having driving and driven elements and a clutch mechanism to drivingly engage and disengage said elements, pressure fluid operated control means to automatically effect engagement and disengagement of said clutch mechanism including an automatically actuated, pressure fluid operated control valve shiftable between predetermined clutch engaged and clutch disengaged positions, and a thermal responsive element to prevent shift of said control valve to one of said positions, said thermal responsive element comprising a thermostatically operated blocker element arranged in contact with the pressure fluid of the control system and movable between different positions with variation in the temperature of the pressure fluid supplied to said control valve, one of said blocker positions positively blocking shift of said control valve and another of said blocker positions permitting shift of said control valve.

2. In a power transmission unit comprising a fluid operated power transmitting device having driving and driven elements and a clutch mechanism to drivingly engage and disengage said elements, pressure fluid operated control means to automatically effect engagement and disengagement of said clutch mechanism including a pressure fluid operated control valve shiftable between predetermined clutch engaged and clutch disengaged positions, and a thermal responsive element to prevent shift of said control valve to one of said positions, said thermal responsive element comprising a thermostatically operated blocker element arranged in contact with the pressure fluid of the control system and movable between different positions with variation in the temperature of the pressure fluid supplied to said control valve, one of said blocker positions blocking shift of said control valve to a clutch engaging position and another of said blocker positions permitting shift of said control valve to said clutch engaging position; said blocker element including a thermally responsive bimetallic actuator portion and a blocker portion actuable by said actuator portion adapted to be moved into and out of shift blocking positions for said valve.

3. In a pressure fluid receiving valve body having a bore with a pressure fluid operated valve shiftable therein between a plurality of different control positions, a thermostatically operated control device for said valve mounted in said valve body having portions located in the pressure fluid receiving portion of said valve body that are deformable by the variation in the temperature of the pressure fluid introduced to the valve body, said control device having other portions connected to and actuable by said first mentioned portions of said control device arranged so as to be placed in positions that positively block shift of said valve at certain temperatures of the pressure fluid in the valve body and permit shift of the said valve at other temperatures of the valve operating pressure fluid.

4. In a power transmission for an engine driven motor vehicle including an accelerator to control the transmission output speed and torque, a hydrokinetic torque converter including relatively rotatable impeller and turbine elements, a first clutch mechanism operable to mechanically connect and disconnect said impeller and turbine elements, a planetary gear mechanism drivingly connected to said converter turbine element, a second clutch mechanism to control operation of said planetary gear mechanism, pressure fluid operated control valving for effecting engagement and disengagement of said clutch mechanisms, transmission output speed and torque responsive pressure fluids applicable to said control valving to effect operation thereof, and a thermostatically controlled element responsive to the temperature of the pressure fluid applied to the control valving for said first clutch mechanism to prevent operation of this control valving to effect engagement of said first clutch when the temperature of the pressure fluid supplied to said last mentioned valving is below a predetermined value, said thermostatically controlled element comprising a member positioned in contact with the valve operating pressure fluid and arranged to be reshaped by predetermined changes in temperature of said valve operating fluid, said last mentioned member including a blocker portion arranged to be moved into and out of positions blocking movement of said valving to clutch engaging positions with changes in shape of the said member.

5. A power transmission unit for a motor vehicle having an engine and an accelerator control therefor, said power transmission unit comprising a hydrokinetic torque converter including an impeller wheel drivingly connected to the engine, a relatively rotatable runner wheel, and clutch means adapted to be engaged to directly drivingly connect the impeller and runner wheels, a gear box including an input shaft drivingly connected to the runner wheel, an output shaft, a planetary gear train adapted to be drivingly connected between said input and output shaft, brake means associated with said gear train adapted to be applied thereto to activate said planetary gear train to provide means for the transmission of a torque multiplying underdrive from said input shaft to said output shaft, and direct drive clutch means connected to said planetary gear train adapted to be engaged to provide means for the transmission of a direct drive from said input shaft to said output shaft, and a pressure fluid operated control system for said power transmission unit comprising a source of pressure fluid, conduit means connecting said source to said planetary brake means and said converter and direct drive clutch means to provide for pressure fluid operation thereof, control valving connected with said conduit means to automatically control operation of said brake means and said converter and direct drive clutch means, including output shaft speed and torque responsive differential pressure fluid operated control valves adapted to automatically effect engagement and disengagement of said clutch and brake means to effect changes in the drives transmitted by said transmission, and a thermal responsive element to prevent clutch engaging shift of at least one of said control valves, said thermal responsive element comprising a thermostatically operated blocker element arranged in contact with the pressure fluid of the control system and movable between different positions with variation in the temperature of the pressure fluid supplied to said control valve, one of said blocker positions positively blocking automatic shift of said one control valve to a clutch engaging position and another of said actuator positions permitting shift of said one control valve to a clutch engaging position; said blocker element including a thermally responsive bimetallic actuator portion and a blocker portion actuable by said actuator portion adapted to be moved into and out of positions to prevent clutch engaging shift of said one valve.

References Cited in the file of this patent

UNITED STATES PATENTS

| 1,943,527 | Hayes | Jan. 16, 1934 |
| 2,095,833 | Rockwell | Oct. 12, 1937 |
| 2,176,138 | Kelley | Oct. 17, 1939 |
| 2,323,601 | Hobbs | July 6, 1943 |
| 2,368,684 | Simpson | Feb. 6, 1945 |
| 2,372,817 | Dodge | Apr. 3, 1945 |
| 2,374,303 | Osborne | Apr. 24, 1945 |
| 2,402,229 | Johnson | June 18, 1946 |
| 2,562,464 | Jandasek | July 31, 1951 |
| 2,568,007 | Jandasek | Sept. 18, 1951 |
| 2,591,342 | Dodge | Apr. 1, 1952 |
| 2,630,893 | Misch et al. | Mar. 10, 1953 |
| 2,640,373 | Jandasek | June 2, 1953 |

FOREIGN PATENTS

| 479,119 | Germany | July 2, 1927 |

OTHER REFERENCES

Packard Pointers #10, S. A. E. Journal-Packard Automatic Transmission, June 27, 1949.